(12) United States Patent
Hagmann et al.

(10) Patent No.: US 7,048,679 B2
(45) Date of Patent: May 23, 2006

(54) TOOL-CHANGING SYSTEM

(75) Inventors: Michael Hagmann, Göppingen (DE); Friedrich Winckler, Schwäbisch Gmünd (DE)

(73) Assignee: Ex-Cell-O GmbH, Eislingen/Fils (DE)

( * ) Notice: Subject to any disclaimer, the term of this patent is extended or adjusted under 35 U.S.C. 154(b) by 0 days.

(21) Appl. No.: 10/841,248

(22) Filed: May 7, 2004

(65) Prior Publication Data

US 2005/0020419 A1    Jan. 27, 2005

Related U.S. Application Data

(63) Continuation of application No. PCT/DE02/04156, filed on Nov. 8, 2002.

(30) Foreign Application Priority Data

Nov. 8, 2001 (DE) ............... 101 54 480
Nov. 9, 2001 (DE) ............... 101 54 708

(51) Int. Cl.
*B23Q 3/157* (2006.01)
(52) U.S. Cl. .......................... 483/27; 483/39
(58) Field of Classification Search ........... 483/41, 483/40, 48, 36, 38, 3, 37, 39
See application file for complete search history.

(56) References Cited

U.S. PATENT DOCUMENTS

| | | | |
|---|---|---|---|
| 4,156,962 A * | 6/1979 | Haller ................... | 483/46 |
| 4,590,662 A | 5/1986 | Norota | |
| 5,281,194 A | 1/1994 | Schneider | |
| 5,704,884 A * | 1/1998 | Uemura et al. ............ | 483/3 |
| 6,071,220 A * | 6/2000 | Sugihara et al. .......... | 483/41 |
| 6,325,748 B1 | 12/2001 | Watanabe et al. | |
| 6,464,623 B1 | 10/2002 | Laur et al. | |

FOREIGN PATENT DOCUMENTS

| | | |
|---|---|---|
| DD | 294 653 A5 | 10/1991 |
| DE | 87 07 780.9 U1 | 8/1987 |
| DE | 38 18 564 C2 | 12/1989 |
| DE | 38 19 210 A1 | 12/1989 |
| DE | 38 40 422 C2 | 5/1990 |
| DE | 40 33 036 A1 | 1/1992 |
| DE | 197 22 080 A1 | 12/1998 |
| DE | 100 20 801 A1 | 11/2001 |
| EP | 0 900 627 A2 | 3/1999 |
| EP | 1 086 781 A2 | 3/2001 |
| GB | 1229755 | 4/1971 |

* cited by examiner

*Primary Examiner*—Boyer D. Ashley
*Assistant Examiner*—Dana Ross
(74) *Attorney, Agent, or Firm*—Alston & Bird LLP

(57) ABSTRACT

The invention discloses a tool-changing concept in which tools are accommodated in a rack and, by means of a storage and retrieval unit located behind the rack, are removed and fed through the rack to a tool changer, by means of which it is possible to remove a tool from a spindle of the machining center and to insert the tool fed by the storage and retrieval unit.

11 Claims, 7 Drawing Sheets

TOOL-CHANGING SYSTEM

CROSS REFERENCE TO RELATED APPLICATIONS

The present application is a continuation application of international application PCT/DE02/04156, filed Nov. 8, 2002, and also claims the benefit of German Application No. 101 54 480.4, filed Nov. 8, 2001, and German Application No. 101 54 708.0, filed Nov. 9, 2001, all of which are incorporated herein by reference in their entirety and for all purposes.

FIELD OF THE INVENTION

The invention relates to a method for changing tools in a machine tool, to a tool-changing system for a machine tool, and to a loading carriage that can be used in the method according to the invention.

BACKGROUND OF THE INVENTION

In modern machining centers, a multiplicity of tools can be supplied in order to manage the wide variety of machining tasks. In order to keep the cycle times to a minimum, these tool magazines are on the one hand of extremely compact construction in order to allow short access times. In machining centers, use is made, for example, of disk-type magazines, in which the tools are mounted on a rotatable disk, of cradle-type magazines with cradle-like mounts in which the tools are positioned, or of rack magazines, from which the respectively required tool is fed to a spindle of the machining center.

SUMMARY OF THE INVENTION

In accordance with the invention, a method of changing tools in a machine tool and also a tool-changing system are provided by means of which the cycle times during tool changing are minimal.

In the method according to the invention, use is made of a tool-changing system in which the tools are accommodated in a tool magazine and are transferred to a tool changer by means of a storage and retrieval unit. This tool changer can be moved, by the storage and retrieval unit, from a receiving position, for receiving the tool, into a transfer position, in which the tool changer penetrates into an operating space of the machine tool and can receive a tool accommodated in the spindle or can transfer to the spindle the tool previously received by the storage and retrieval unit. That is to say, the tool changer used is formed such that it can receive a tool from the spindle and feed a replacement tool. One advantage of the method according to the invention is thus that a replacement tool is applied in each case both by the storage and retrieval unit and by the tool changer, so that, for all practical purposes, a buffer store is formed by two tools and the cycle times are minimal. Since virtually any desired number of tools can be accommodated in the magazine, it is possible for even extremely complex machining operations to be carried out fully automatically by way of a multiplicity of tool changes.

The tool magazine here is formed such that individual tools accommodated therein can be exchanged or changed around during the main machining time of the machine tool, this ensuring the greatest possible level of flexibility of the machine tool.

The operational reliability of the machine can be further improved if the wear of the tool and the tool type or other tool parameters that are pertinent for machining are sensed and, in dependence on these parameters, tools are removed from, or fed to, the rack by means of the storage and retrieval unit.

In the tool-changing system according to the invention, the tool magazine is preferably configured as a rack in which the tools are disposed one above the other and have their axis oriented parallel to the Z-axis.

The tool-changing system can be formed in a particularly compact manner if the rack has an aperture through which tools can be transferred from the storage and retrieval unit to the tool changer or vice versa.

The dimensions of this aperture are preferably selected in dependence on the interference circle of the tool changer, so that this can engage through the aperture without additional displacement.

In order to increase the tool capacity of the machine tool, it is possible to provide a plurality of racks, these racks then being disposed such that the tools accommodated therein are disposed in the same axial plane as the tools in the adjacent rack.

The operation of exchanging the tools and changing them around in the rack can be further simplified if a plurality of tools are accommodated in an exchangeable cassette that, in turn, can be inserted into the rack.

The tool changing can be carried out very quickly if the tool changer used is a 90° double gripper which pivots into the aperture in order to receive the tool and pivots into the operating space in order to transfer the tool to the spindle.

In this variant, it is preferred if the pivoting mechanism of the double gripper is in operative connection with the opening/closing mechanism of a door of an operating space enclosing the spindle, so that the door is opened automatically when the double gripper pivots into the operating space.

The operation of exchanging the above-mentioned cassettes for accommodating a plurality of tools can be carried out in a particularly straightforward manner using a loading carriage in which there are provided inserts for cassettes that are to be fed and removed.

It is preferred here if the cassette carriage is provided with four inserts which form a square in plan view, two being occupied by new cassettes and two being provided for picking up cassettes.

An alternative to the cassette carriage with four inserts is provided by a cassette carriage with three inserts which form a triangle in plan view, optionally two inserts being occupied by new cassettes and one insert being provided for picking up cassettes.

Other developments of the invention form the subject matter of the rest of the subclaims.

BRIEF DESCRIPTION OF THE DRAWINGS

A preferred exemplary embodiment of the invention is explained in more detail hereinbelow with reference to schematic drawings, in which.

DETAILED DESCRIPTION OF THE INVENTION

Figure 1:
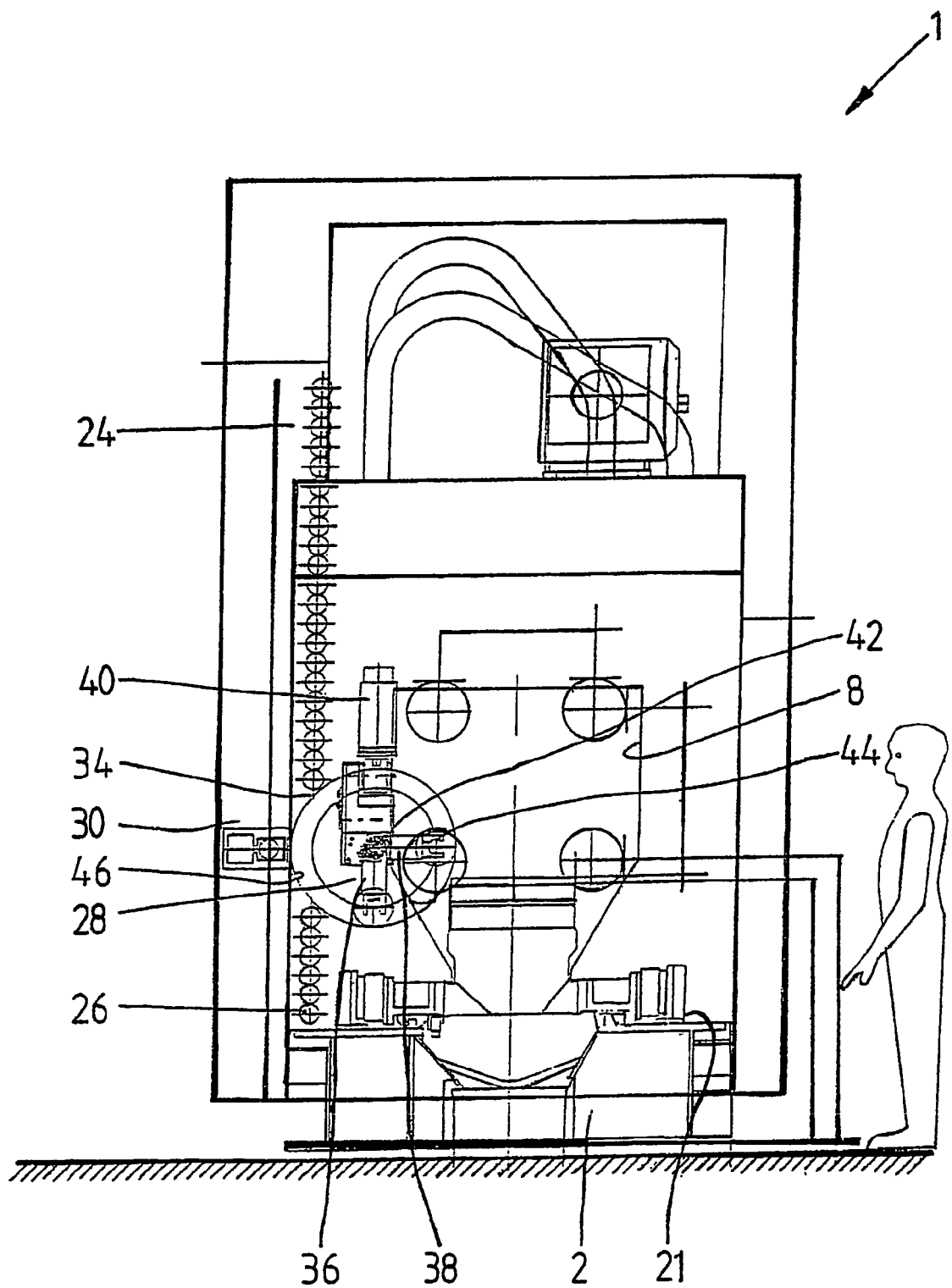
FIG. 1 shows a side view of a machine tool according to the invention.
Figure 2:
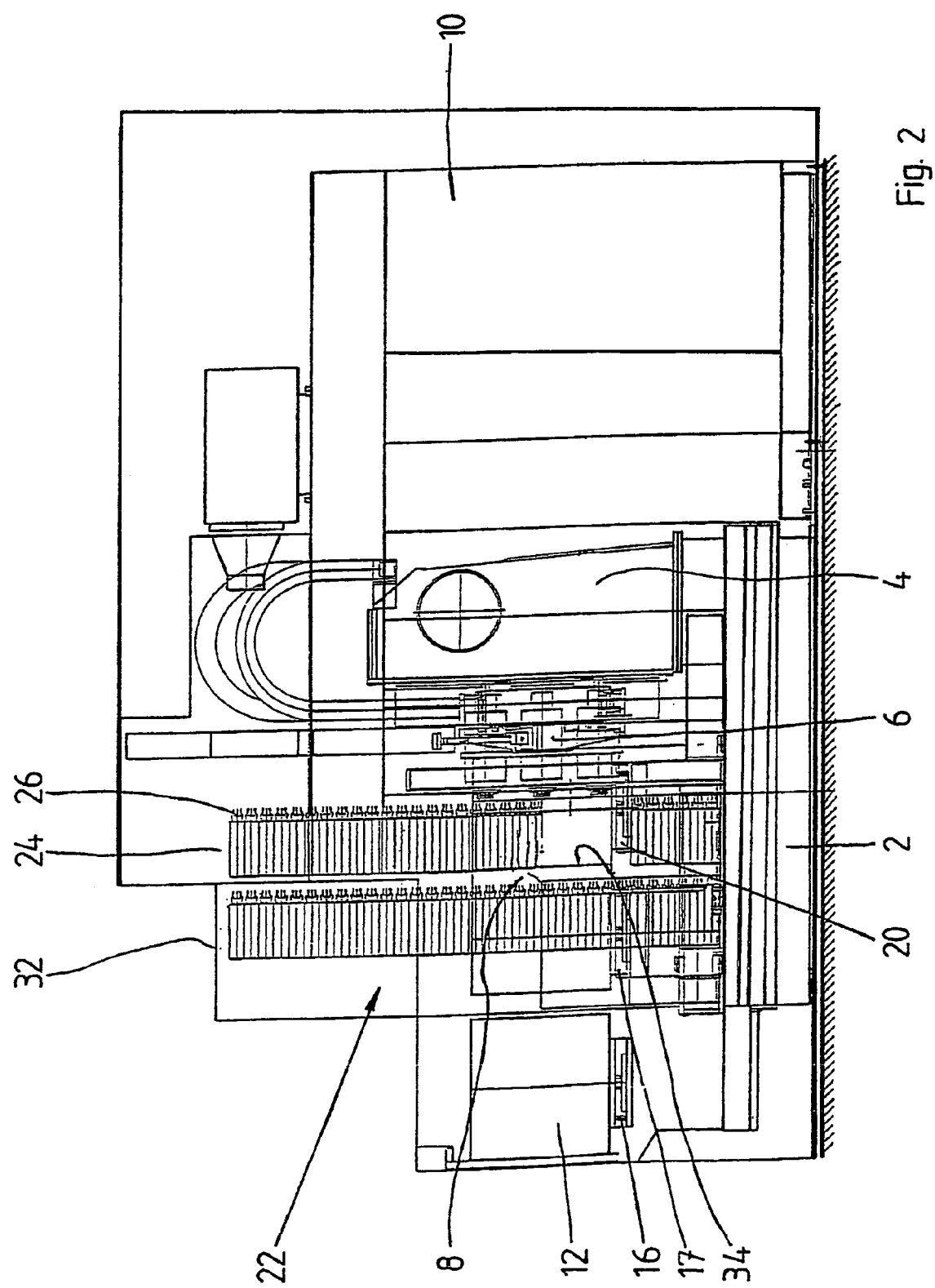
FIG. 2 shows a front view of the machine tool from FIG. 1.
Figure 3:
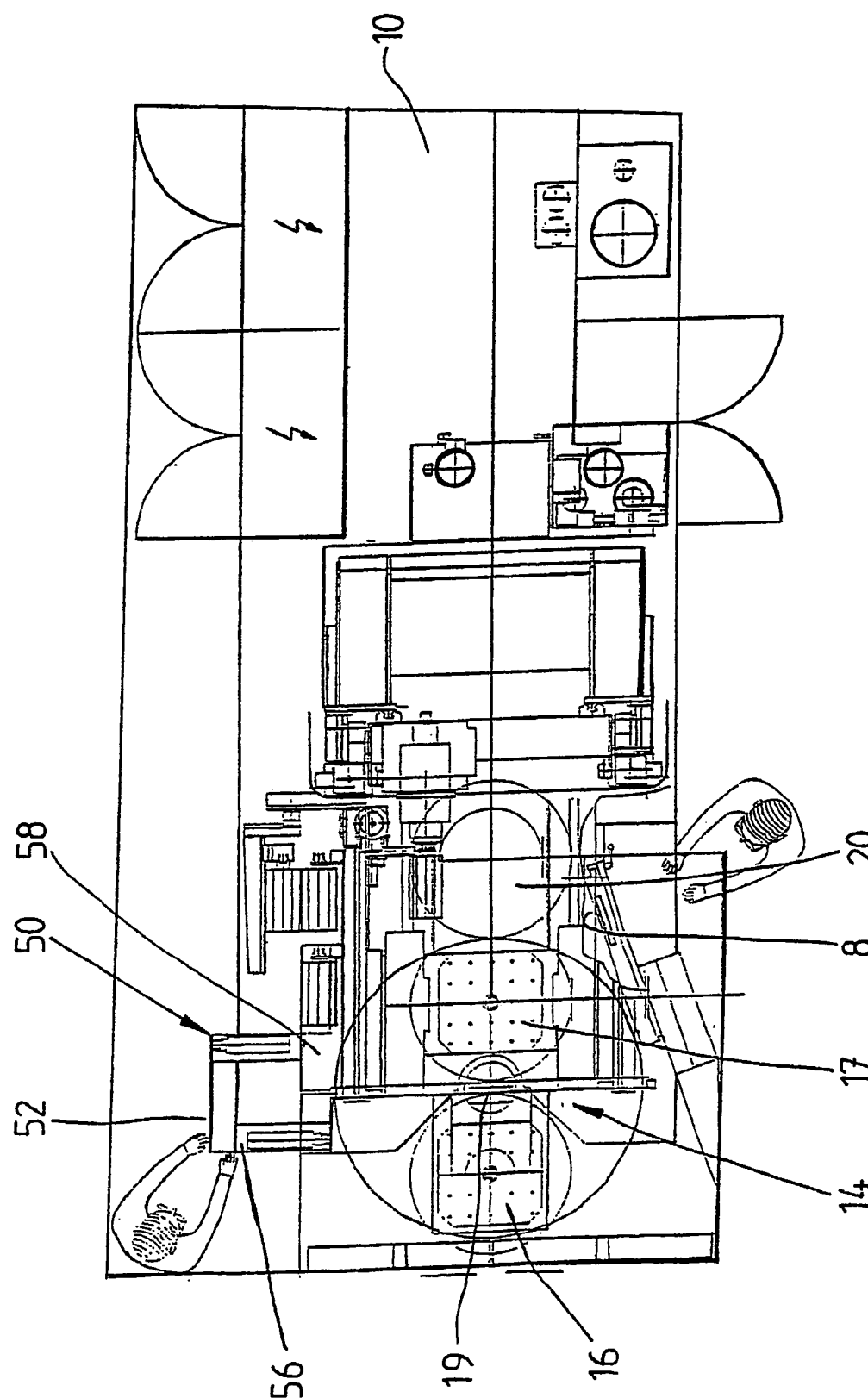
FIG. 3 shows a plan view of the machine tool from FIG. 1.

FIG. 1 shows a machining center 1 that, by virtue of its modular construction, can be adapted in a very flexible manner to different production tasks. The machining center 1 may be configured with columns, sleeves or linear drives. In the exemplary embodiment that is illustrated in FIGS. 1 to 3, the machining center 1 has a machine bed 2 on which a machine column 4 is supported. The latter carries a spindle 6 which can be displaced by means of X-/Y-guides. Depending on the design principle, the Z-feed can then be carried out by a sleeve, the column or a workpiece table. The actual configuration differs in dependence on the design principle (sleeve, column, linear drive) and does not have any bearing on the invention described hereinbelow.

In the illustration according to FIGS. 1 and 2, the spindle 6 is shown in a number of operating positions within a closed operating space 8. The spindle 6 is configured with suitable tool-clamping systems, for example an HSK. The machine-control means with the cooling for the machine and the hydraulics and coolant installations are disposed in the region designated 10 in FIG. 2.

The workpiece 12 that is to be machined is fed and removed by means of a pallet changer 14 which, in the exemplary embodiment illustrated, is configured with two pallets 16, 17. These can be rotated about an axis 19, so that one pallet 17 with the workpiece 18 that is to be machined is disposed in the operating space 8 and the other pallet 16, for loading and unloading purposes, is disposed outside the operating space. From the pallet, the workpiece is transferred to an NC turntable 20, on which the workpiece 18 that is to be machined is clamped firmly for machining purposes. In the exemplary embodiment illustrated, the NC turntable 20 is mounted on the machine bed 2 via guides 21 extending out of the operating space 8, and thus can be displaced in the Z-direction.

The machining center 1 has a tool-changing system 22 according to the invention with the following main structural elements: at least one rack 24 for accommodating a plurality of tools 26, a tool changer, which in the exemplary embodiment illustrated is configured as a double gripper 28 (FIG. 1), and a storage and retrieval unit 30 (FIG. 1), via which it is possible to remove the tools 26 from the rack 24 and to move them into a receiving position (FIG. 1) in relation to the double gripper 28.

As can be gathered from FIG. 2 in particular, two racks 24, 32 are provided in the machining center illustrated, the tools 26 being disposed one above the other in each case in these racks. The axis of the tools 26 here is disposed in an axial plane parallel to the spindle axis (Z-axis). In the basic version, however, only one rack 24 is provided.

The storage and retrieval unit 30, according to FIG. 1, is provided on that side of the racks 24, 32 which is remote from the double gripper 28, and can be displaceable in the X-, Y- and Z-directions, so that each of the tools accommodated (in the exemplary embodiment illustrated sixty tools 26) can be approached and removed from the racks 24, 32 or inserted into the corresponding position.

According to FIG. 2, the rack 24 is provided with an aperture 34. This aperture is adapted to the interference circle of the double gripper 28, so that it is possible for the gripper arms 36, 38 positioned at the 90° angle, upon pivoting of the double gripper 28, to penetrate into this aperture 34 and into a transfer position in relation to the storage and retrieval unit which, in the receiving position, is located behind the aperture 34 (see FIG. 1).

The double gripper 28, which can be seen in FIG. 1 in particular, is disposed laterally along the side of the operating space 8 and can be rotated about an axis of rotation 42 by means of a pivoting drive 40. The double gripper 28, furthermore, can be displaced in the Z-direction (perpendicularly to the plane of FIG. 1) in order for the tool 26 to be disengaged from, or inserted into, the spindle 6.

Each gripper arm 36, 38 has, at its end portion, U-shaped grippers 44, by means of which the tool 26 can be picked up in a form-fitting or force-fitting manner.

The gripper arms 36, 38, which are positioned at right angles to one another, can be pivoted circumferentially along the interference circle 46. Pivoting the gripper arms 36, 38 into the operating space 8 opens a door, the opening/closing mechanism of which is in operative connection with the rotary drive 40 of the double gripper 28. That is to say, the door 48 is opened or closed automatically when the double gripper 28 is pivoted in the direction of the operating space 8.

The machining center 1, furthermore, has a monitoring device (not illustrated) via which, for example, the wear of the tool 26, the tool type or other pertinent parameters of the tools 26 can be sensed. This monitoring device can emit a signal to the storage and retrieval unit 30, so that the latter removes a defective tool 26 or displaces it to a predetermined rack position.

In a preferred exemplary embodiment of the invention, a number of tools in each case are brought together in a cassette 50, in which the tools 26 are accommodated one above the other. These cassettes are then inserted into the racks 24, 32, so that a multiplicity of tools 26 can be exchanged in a very short period of time.

Figure 4:
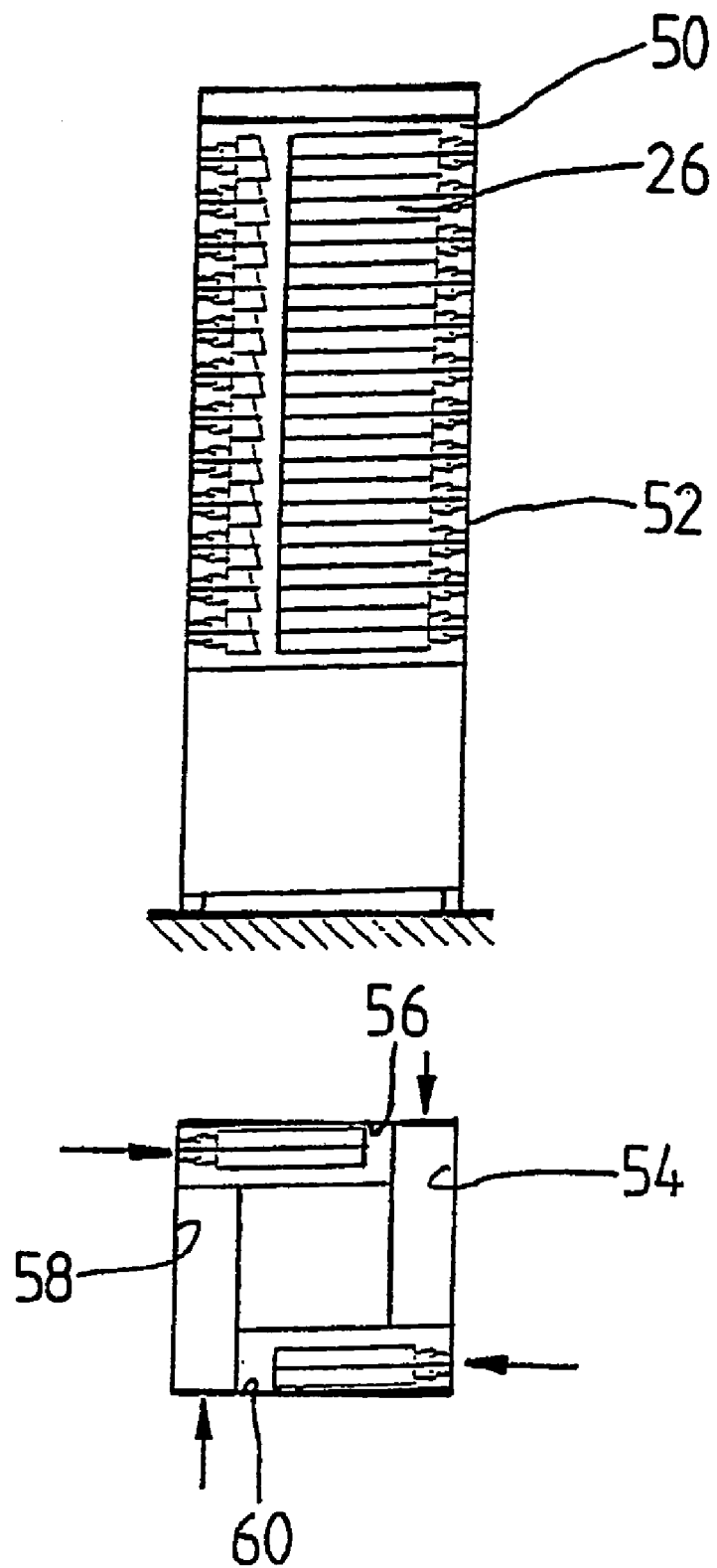
FIG. 4 shows views of a loading carriage of a tool-changing system according to the invention with four inserts.

In order to exchange the cassettes 50, use is preferably made of a loading carriage 52 according to FIG. 4. This loading carriage 52 has four inserts 54, 56, 58 and 60 which, in the plan view in FIG. 4, are disposed such that they bound a square. The inserts are each open from the end face (arrow in FIG. 4), so that the cassettes 50 can be inserted in the arrow direction. In order to exchange a cassette 50, according to FIG. 3, the loading carriage 52 is aligned in relation to the rack 32, 34 by way of an insert 58 and then displaced so that the cassette 50 penetrates into the insert 58. The cassette 50 is removed, the carriage 52 is rotated through 90° and, for example, the cassette 50 located in the insert 56 is inserted into the rack 24, 32. The loading carriage 52 may be provided with a lifting means, so that it is possible to reach any rack position.

Figure 5:
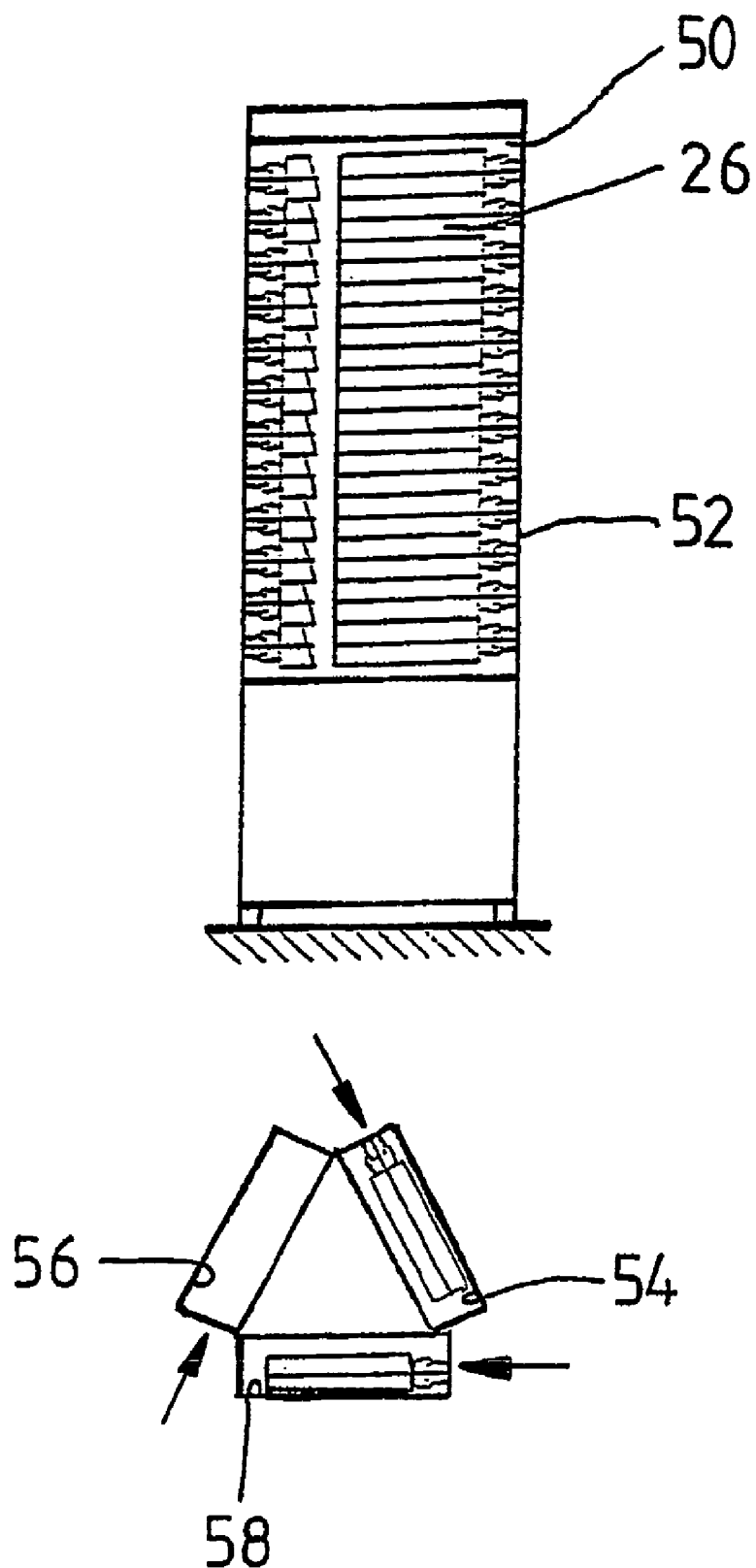
FIG. 5 shows a view of a loading carriage of a further tool-changing system according to the invention, this time with three inserts.

An alternative to the loading carriage 52 with four inserts (54, 56, 58, 60) is provided by a loading carriage 62 with three inserts (54, 56, 58) which, in plan view, form a triangle (FIG. 5). As in the above-described embodiment according to FIG. 4, the three inserts (54, 56, 58) are open from the end face (arrow in FIG. 5). The functioning is similar to the functioning of the loading carriage 52 with four inserts (54, 56, 58, 60), although the three-insert loading carriage 62, rather than executing 90° rotations for accommodating and transferring the cassettes 50, executes 120° rotations, in accordance with its triangular construction.

Figure 6:
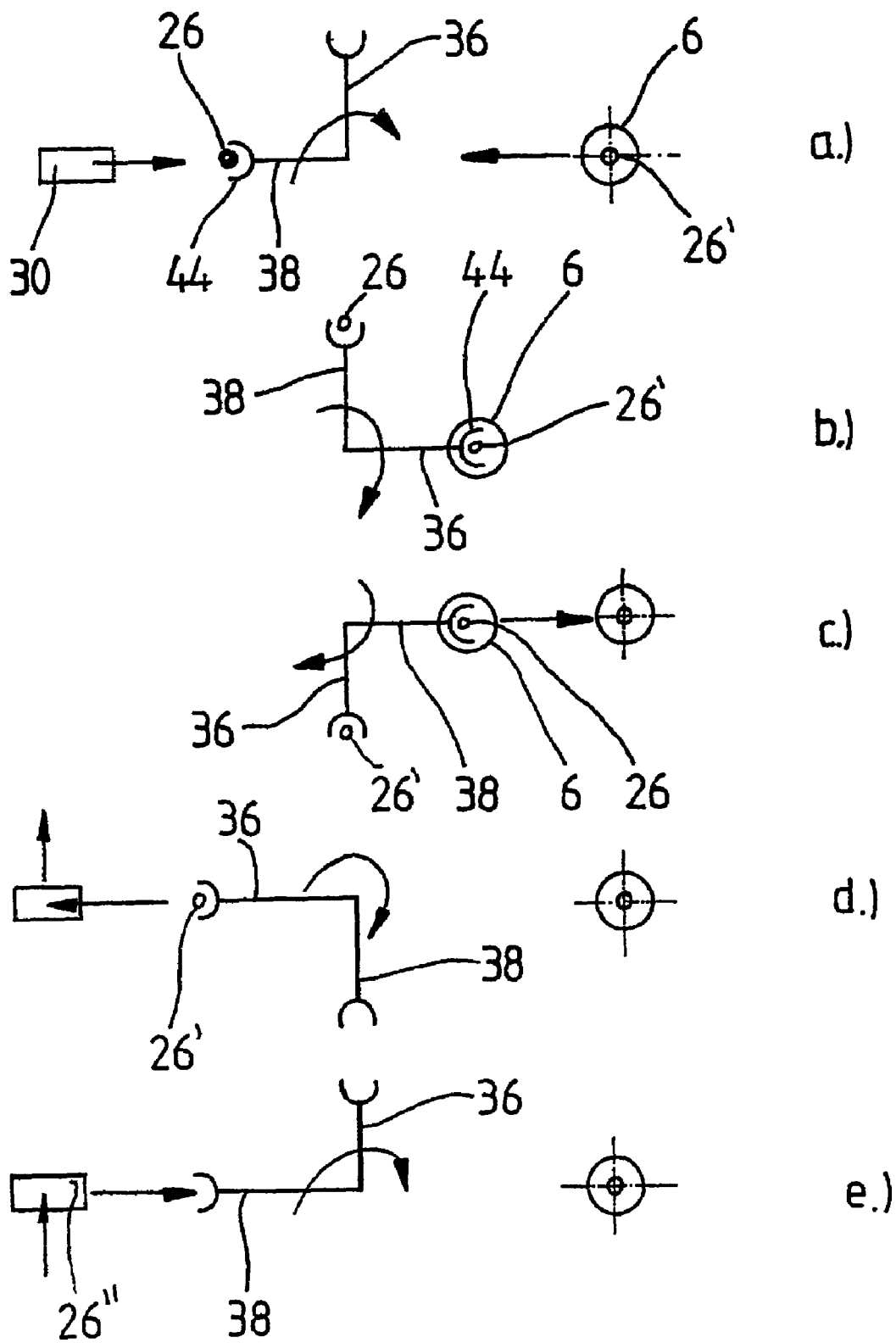
FIG. 6 shows a flow diagram of a tool-changing operation.
Figure 7:
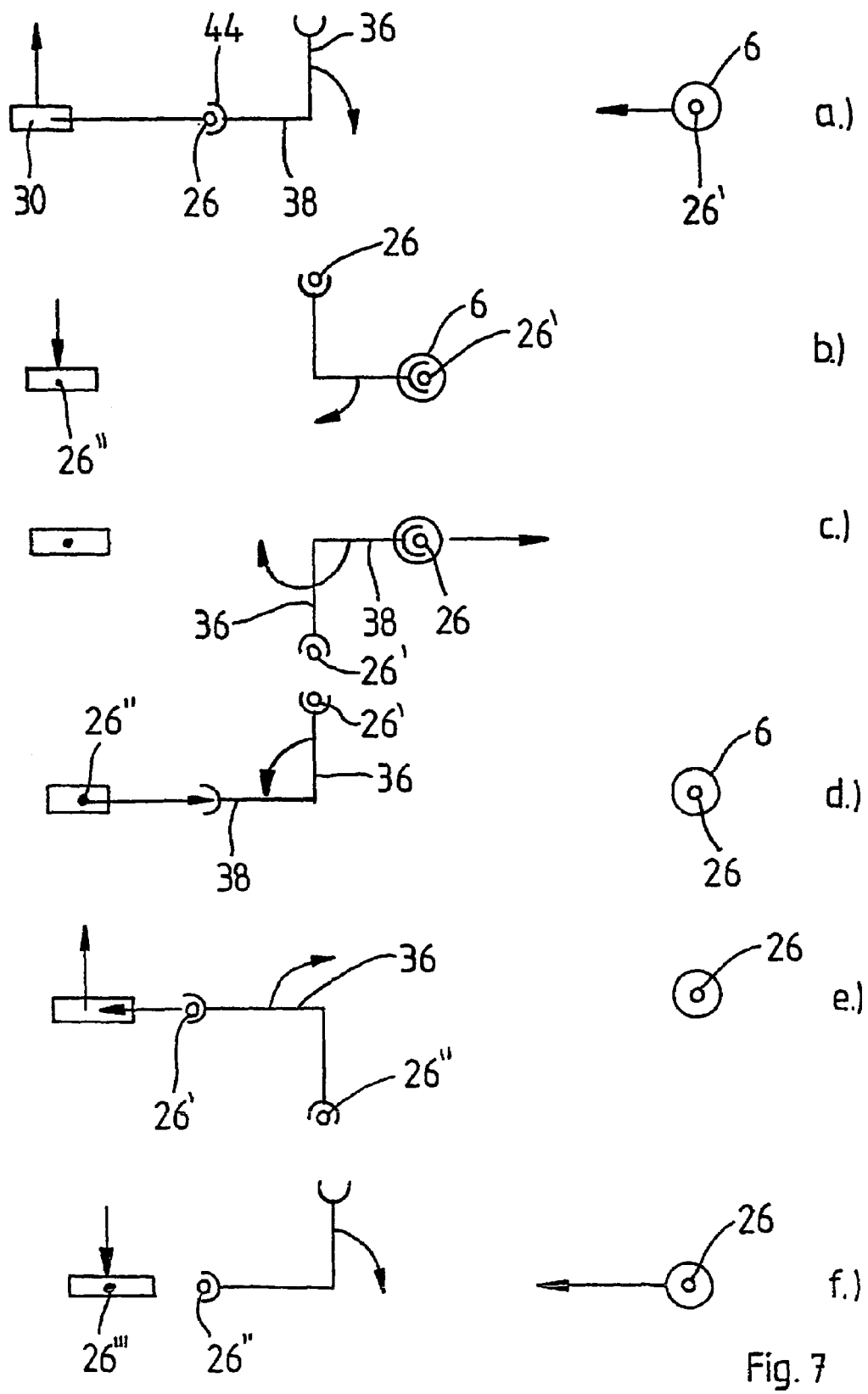
FIG. 7 shows a flow diagram of an optimized tool-changing operation.

The function of the tool-changing systems according to the invention will be explained in more detail with reference to the schematic illustration in FIGS. 6 and 7, FIG. 6 showing a variant which is only used if relatively long cycle times are acceptable.

Let us assume that a tool 26' has been clamped into the spindle 6 and cutting machining is being carried out. At the same time, a replacement tool 26, previously received by the storage and retrieval unit 30, is located in the gripper 44 of the gripper arm 38. The gripper arm 36 does not carry any tools.

Following the cutting machining, the spindle 6 with the tool 26' is moved into a transfer position in relation to the double gripper 28, and the latter is simultaneously pivoted into the operating space 8. Via the machine-control means, the interference circle 46 of the double gripper 28 is monitored and, if appropriate, the spindle 6 is braked, so that the gripper arm 36 can move into the transfer position. This transfer position is designated b in FIG. 6. In this case, the spindle 6 with the tool 26' which is to be relinquished moves into the gripper 44, the latter grips the tool 26' which is to be relinquished, and the double gripper 28 is displaced in the Z-direction (perpendicularly to the plane in FIG. 6), so that the tool 26' is removed from the spindle 6. The pivoting movement of the double gripper 28 in the clockwise direction commences at the same time, so that, according to step c, the gripper arm 36 with the tool 26' accommodated therein is pivoted downward and the replacement tool 26 is moved, with the gripper arm 38, into the transfer position in relation to the spindle. The double gripper 28 is then displaced in the Z-direction for insertion of the tool 26 into the spindle 6, the latter moves out of the collision region into its operating position and the double gripper 28, according to step d, is pivoted out of the operating space 8, so that the tool 26' which is to be relinquished is pivoted into a receiving position in the aperture 34. The storage and retrieval unit 30 receives the tool 26' and relinquishes it at its predetermined rack location and guides a replacement tool 26" to the receiving position, in which the gripper arm 38 is located in the meantime, the tool 26" being inserted into this gripper arm—the cycle can begin anew.

In the case of the tool-changing concept according to the invention, however, the method illustrated in FIG. 7 is preferred. In this method, the steps a, b and c are substantially the same as in the above-described exemplary embodiment. The significant difference is that, following transfer of the replacement tool 26 (step c), the storage and retrieval unit 30 immediately receives a further tool 26" from the rack 24, 32 and displaces it into the receiving position in the region of the aperture 34. In the meantime, the tool 26 already located in the gripper 28 has been transferred to the spindle, so that the gripper arm 38 is free. The other gripper arm 36 carries the tool 26' which is to be relinquished.

Following this the double gripper 28 is pivoted out of the operating space 8 and—in contrast to the above-described exemplary embodiment—executes a 180° pivoting movement, so that the free gripper arm 38 is moved into the receiving position; the gripper arm 36 loaded with the tool 26' is located vertically upward (step d). The tool 26" made available by the storage and retrieval unit 30 is transferred to the gripper arm 38, the storage and retrieval unit 30 remaining in its standby position. The double gripper 28 is then pivoted back through 90°, so that the gripper arm 36 with the tool 26' which is to be relinquished is removed into the receiving position (step e). The tool 26' is received by the storage and retrieval unit 30 and put away in the rack 24, 32. The double gripper then pivots through 90° into its starting position and the storage and retrieval unit 30 fetches a further tool 26'''. The cycle can begin anew.

The above-described tool-changing method thus always provides for two replacement tools in a type of buffer store, so that it is possible to realize extremely short cycle times.

In the above-described exemplary embodiments, the gripper has pivoted predominantly in the clockwise direction. Of course, it is also possible for the tool-changing operation to be carried out with the gripper being pivoted in the opposite direction "from beneath".

It is also possible in principle, instead of the racks 24, 32 with a plurality of cassettes 50, for an exchangeable cassette to form in each case one rack.

First tests have shown that the concept according to the invention makes it possible to realize supply times of less than one second.

The method according to the invention can also be implemented by the storage and retrieval unit 30 being displaced into a receiving position alongside the rack 24.

In order to reduce the cycle times further, it is possible for the chuck of the spindle 6 to be open as it is displaced from its operating position into the transfer position, so that the double gripper 28 can immediately pull out the old tool 26.

The invention discloses a tool-changing concept in which tools are accommodated in a rack and, by means of a storage and retrieval unit located behind the rack, removed and fed through the rack to a tool changer, by means of which it is possible to remove a tool from a spindle of the machining center and to insert the tool fed by the storage and retrieval unit.

LIST OF REFERENCE NUMERALS

1 Machining center
2 Machine bed
4 Column
6 Spindle
8 Operating space
10 Region
12 Workpiece
14 Pallet changer
16 Pallet
17 Pallet
18 Workpiece
19 Pivot axis
20 NC turntable
21 Guides
22 Tool-changing system
24 Rack
26 Tool
28 Double gripper
30 Storage and retrieval unit
32 Rack
34 Aperture
36 Gripper arm
38 Gripper arm
40 Rotary drive
42 Axis of rotation
44 Gripper
46 Interference circle
48 Door
50 Cassette
52 Loading carriage
54 Insert
56 Insert 58 Insert
60 Insert
62 Loading carriage

The invention claimed is:

1. A tool-changing system for a machine tool, comprising:
  a tool changer with at least two receiver; for a tool which is transferable to at least one, or from at least one, spindle, each spindle defining a spindle axis;
  a tool magazine comprising a rack for accommodating a multiplicity of tools, the rack extending along a rack axis and being configured such that the tools are inserted into the rack perpendicularly to the rack axis, the rack further defining an aperture extending through the rack perpendicularly to the rack axis and being configured to accommodate an interference circle of the tool changer, and the rack being further oriented such that the rack axis is disposed perpendicularly to the spindle axis of the at least one spindle; and
  a storage and retrieval unit via which the tools are removable from the magazine and are moveable into a preliminary position for transferring the tool to the tool changer, the storage and retrieval unit being separated from the tool changer by the rack and being configured to transfer the tool to the tool changer through the aperture defined by the rack.

2. The tool-changing system of claim 1, in which the tool magazine has at least two racks located one behind the other in the Z-direction.

3. The tool-changing system of claim 1, in which a plurality of exchangeable cassettes for accommodating tools are accommodated in the rack.

4. The tool-changing system of claim 1, in which the tool changer is a pivotable double gripper having a pivoting mechanism.

5. The tool-changing system of claim 4, in which an operating enclosure surrounding the spindle is configured to be closed by a door, an opening/closing mechanism of which is in operative connection with the pivoting mechanism of the double gripper.

6. The tool-changing system of claim 1, further comprising a monitoring device for sensing tool wear, type of tool or other parameters of the tool, and having a control means via which, in response to a signal emitted by the monitoring device, tools are removable from the rack.

7. The tool changing system of claim 1, further comprising a loading carriage comprising a plurality of inserts each configured to receive one of a plurality of cassettes from the rack, the plurality of inserts being serially disposed substantially end-to-end and cooperating to define a peripheral surface having a plurality of end faces.

8. The tool-changing system of claim 7, in which each of the inserts cooperating to define the peripheral surface is further configured to receive the cassettes through one of the end faces.

9. The tool-changing system of claim 7, in which four inserts for cassettes define the peripheral surface approximately as a square, each of the inserts cooperating to define the square peripheral surface being arranged to receive one of the cassettes through a different one of the end faces.

10. The tool-changing system of claim 7, in which three inserts for cassettes define the peripheral surface approximately as a triangle, each of the inserts cooperating to define the triangular peripheral surface being arranged to receive out of the cassettes through a different one of the end faces.

11. A tool-changing system for a machine tool, comprising:
  a tool changer with at least two receiver; for a tool which is transferable to at least one, or from at least one, spindle extending along a spindle axis;
  a tool magazine in which a multiplicity of tools are accommodated;
  wherein the tool magazine is a rack for accommodating tools with their tool axis disposed parallel to the spindle axis of the spindle of the machine tool; and
  a storage and retrieval unit via which the tools are removable from the magazine and are moveable into a preliminary position for transferring the tool to the tool changer;
  wherein the storage and retrieval unit is adapted to be displaceable on that side of the rack which is remote from the tool changer;
  wherein the rack has an aperture through which the tools are transferred from the storage and retrieval unit to the tool changer; and
  wherein the aperture is adapted in its dimensions to the interference circle of the tool changer.

* * * * *

UNITED STATES PATENT AND TRADEMARK OFFICE
CERTIFICATE OF CORRECTION

| | |
|---|---|
| PATENT NO. | : 7,048,679 B2 |
| APPLICATION NO. | : 10/841248 |
| DATED | : May 23, 2006 |
| INVENTOR(S) | : Hagmann et al. |

Page 1 of 1

It is certified that error appears in the above-identified patent and that said Letters Patent is hereby corrected as shown below:

Column 7,
Line 6, "receiver;" should read --receivers--.

Column 8,
Line 20, "out" should read --one--;
Line 23, "receiver;" should read --receivers--.

Signed and Sealed this

Fifth Day of December, 2006

JON W. DUDAS
*Director of the United States Patent and Trademark Office*